United States Patent
Hamilton

(10) Patent No.: US 10,592,381 B1
(45) Date of Patent: Mar. 17, 2020

(54) DYNAMIC GENERATION OF CUSTOM WEB ANALYTICS DATA

(71) Applicant: FMR LLC, Boston, MA (US)

(72) Inventor: Eric Hamilton, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/418,934

(22) Filed: May 21, 2019

(51) Int. Cl.
*G06F 15/173* (2006.01)
*G06F 11/34* (2006.01)
*H04L 29/08* (2006.01)
*G06F 17/22* (2006.01)
*G06F 16/958* (2019.01)

(52) U.S. Cl.
CPC ........ *G06F 11/3476* (2013.01); *G06F 16/986* (2019.01); *G06F 17/2247* (2013.01); *H04L 67/22* (2013.01)

(58) Field of Classification Search
CPC ............... G06F 11/3476; G06F 16/986; G06F 17/2247; H04L 67/22
USPC ........................................................ 709/224
See application file for complete search history.

(56) References Cited

U.S. PATENT DOCUMENTS

| | | | |
|---|---|---|---|
| 8,359,313 B2 | 1/2013 | Mui et al. | |
| 8,429,243 B1 | 4/2013 | Wang et al. | |
| 2010/0218112 A1 | 8/2010 | Park et al. | |
| 2014/0040786 A1* | 2/2014 | Swanson | G06F 16/957 715/760 |
| 2015/0134669 A1* | 5/2015 | Harris | G06F 16/81 707/741 |
| 2016/0328369 A1* | 11/2016 | Chi | G06F 16/248 |
| 2017/0019489 A1* | 1/2017 | Churchill | G06F 3/04842 |
| 2018/0046637 A1 | 2/2018 | Koopman et al. | |
| 2018/0212972 A1* | 7/2018 | Goodwin | H04L 67/22 |

* cited by examiner

*Primary Examiner* — Alan S Chou
(74) *Attorney, Agent, or Firm* — Proskauer Rose LLP

(57) ABSTRACT

Methods and apparatuses are described for dynamic generation of custom web analytics data. A computing device renders a webpage comprising a plurality of page elements, where the webpage is assigned one or more attributes and each page element is assigned one or more attributes. The computing device detects one or more interactions occurring with one or more of the plurality of page elements on the webpage. For each detected interaction, the computing device identify the page element with which the detected interaction occurred, captures at least one of the one or more attributes of the webpage, captures at least one of the one or more attributes of the identified page element, aggregates the captured attributes of the webpage and the captured attributes of the identified page element into a custom variable, and stores the custom variable in a local memory module of the computing device.

18 Claims, 4 Drawing Sheets

FIG. 4

ETFs

Overview | Screener | Compare ETFs | Liquidity Analyzer | Correlation Tracker | Research & Commentary Custom Screener  Saved Screens  Asset Class  Sector  Geographic Region

Custom Screener

− Basic Criteria

Overview & Ratings
- ☐ Management Fees ⓘ
- ☐ Issuer/Sponsor ⓘ
- ☐ Prospectus Primary Benchmark ⓘ

Performance Returns
- ☐ 1-Year ⓘ
- ☐ 3-Year ⓘ
- ☐ 5-Year ⓘ
- ☐ 10-Year ⓘ
- ☐ Since Inception ⓘ

Classification
- ☐ Fund Type ⓘ
- ☐ Fund Structure ⓘ
- ☐ Asset Class ⓘ

Fund Data
- ☐ Inception Date ⓘ
- ☐ Market Cap ⓘ
- ☐ Last Dividend Rate ⓘ
- ☐ Net Expense Ratio ⓘ
- ☐ Morningstar Category ⓘ
- ☐ Morningstar Overall ⓘ
- ☐ Morningstar 3-Year ⓘ
- ☐ Morningstar 5-Year ⓘ
- ☐ Morningstar 10-Year ⓘ

+ Advanced Criteria

None Selected

Total Matching  0     [View] ← 406

DYNAMIC GENERATION OF CUSTOM WEB ANALYTICS DATA

TECHNICAL FIELD

This application relates generally to methods and apparatuses, including computer program products, for dynamic generation of custom web analytics data.

BACKGROUND

Web analytics is the practice of measuring, collecting, analyzing and reporting online data for the purposes of understanding how a web site is used by its visitors and how to optimize its usage. Generally, the focus of web analytics is to understand a web site's users, their behavior and activities. The study of online user behavior and activities generates valuable intelligence and provides: performance measures of the website against targets, insights on user behaviors and needs, and how the site is meeting those needs, and optimization ability to make modifications to improve the website based on the results, among other things.

In a typical web analytics scenario, the stakeholder (e.g., web site owner, publisher, advertiser, data aggregator, etc.) has metrics that are required to be captured from a given web site or web property. In one example, a stakeholder may be interested in seeing overall traffic to each page of a web site. In addition, the stakeholder may be interested in knowing the number of clicks to each of several check boxes on a particular web page. Typically, out-of-the-box web analytics tools capture web page information when the page calls for a URL refresh. However, for dynamic activities-such as clicks to check boxes, special accommodations have to be made. For example, the stakeholder's request could require many different custom static variables to be created, with each variable manually configured to capture each check box. Furthermore, changes or additions to web analytics variables for a given web page or web property would necessitate the creation of additional custom variables-leading to an increase in analytics resources required to implement the changes, both from a web analytics instrumentation perspective and a web analytics storage configuration perspective. In addition, these types of web analytics tools have difficulty scaling as web sites and/or analysis requirements change.

SUMMARY

Therefore, what is needed are methods and systems that can dynamically and automatically capture custom web analytics data, including granular interactions with a web site and/or web page, and that scales to seamlessly accommodate changes to the analytics scope without requiring intensive reconfiguration of the web page and/or web analytics data capture system or use of a large variety of custom variables that must be monitored and maintained.

The invention, in one aspect, features a system for dynamic generation of custom web analytics data. The system includes a computing device comprising a memory for storing computer-executable instructions and a processor that executes the computer executable instructions. The computing device renders a webpage comprising a plurality of page elements, where the webpage is assigned one or more attributes and each page element is assigned one or more attributes. The computing device detects one or more interactions occurring with one or more of the plurality of page elements on the webpage. For each detected interaction, the computing device identify the page element with which the detected interaction occurred, captures at least one of the one or more attributes of the webpage, captures at least one of the one or more attributes of the identified page element, aggregates the captured attributes of the webpage and the captured attributes of the identified page element into a custom variable, and stores the custom variable in a local memory module of the computing device.

The invention, in another aspect, features a computerized method of dynamic generation of custom web analytics data. A computing device renders a webpage comprising a plurality of page elements, where the webpage is assigned one or more attributes and each page element is assigned one or more attributes. The computing device detects one or more interactions occurring with one or more of the plurality of page elements on the webpage. For each detected interaction, the computing device identify the page element with which the detected interaction occurred, captures at least one of the one or more attributes of the webpage, captures at least one of the one or more attributes of the identified page element, aggregates the captured attributes of the webpage and the captured attributes of the identified page element into a custom variable, and stores the custom variable in a local memory module of the computing device.

Any of the above aspects can include one or more of the following features. In some embodiments, the computing device automatically transmits the custom variable to a web analytics platform of a server computing device upon storing the custom variable in the local memory module. In some embodiments, the web analytics platform parses the custom variable for storage in a web analytics database.

In some embodiments, the computing device overwrites the custom variable in the local memory module with a new custom variable upon detecting a new interaction occurring with one or more of the plurality of interactive elements on the webpage. In some embodiments, one or more attributes of the webpage and the one or more attributes of the page elements comprise HTML attributes. In some embodiments, the HTML attributes comprise an href attribute, a src attribute, a title attribute, a class attribute, an id attribute, a text attribute, a value attribute, a width attribute, a height attribute, and an alt attribute.

In some embodiments, the one or more interactions comprise a single click of a page element, a double click of a page element, a mouseover of a page element, a view of a page element, a swipe of a page element, a load of the webpage, and a change to a document object model (DOM) of the webpage. In some embodiments, aggregating the captured attributes of the webpage and the captured attributes of the identified page element into a custom variable comprises concatenating each captured attribute of the webpage and each captured attribute of the identified page element into a string, wherein each of the captured attributes in the string are separated by a delimiter. In some embodiments, storing the custom variable in a local memory module of the computing device comprises generating a cookie based upon the custom variable and storing the cookie in a browser memory associated with the webpage. In some embodiments, detecting one or more interactions occurring with one or more of the plurality of page elements on the webpage comprises monitoring each of the plurality of page elements for interaction activity.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is an exemplary web page rendered by the browser of the client computing device.

DETAILED DESCRIPTION

Figure 1:
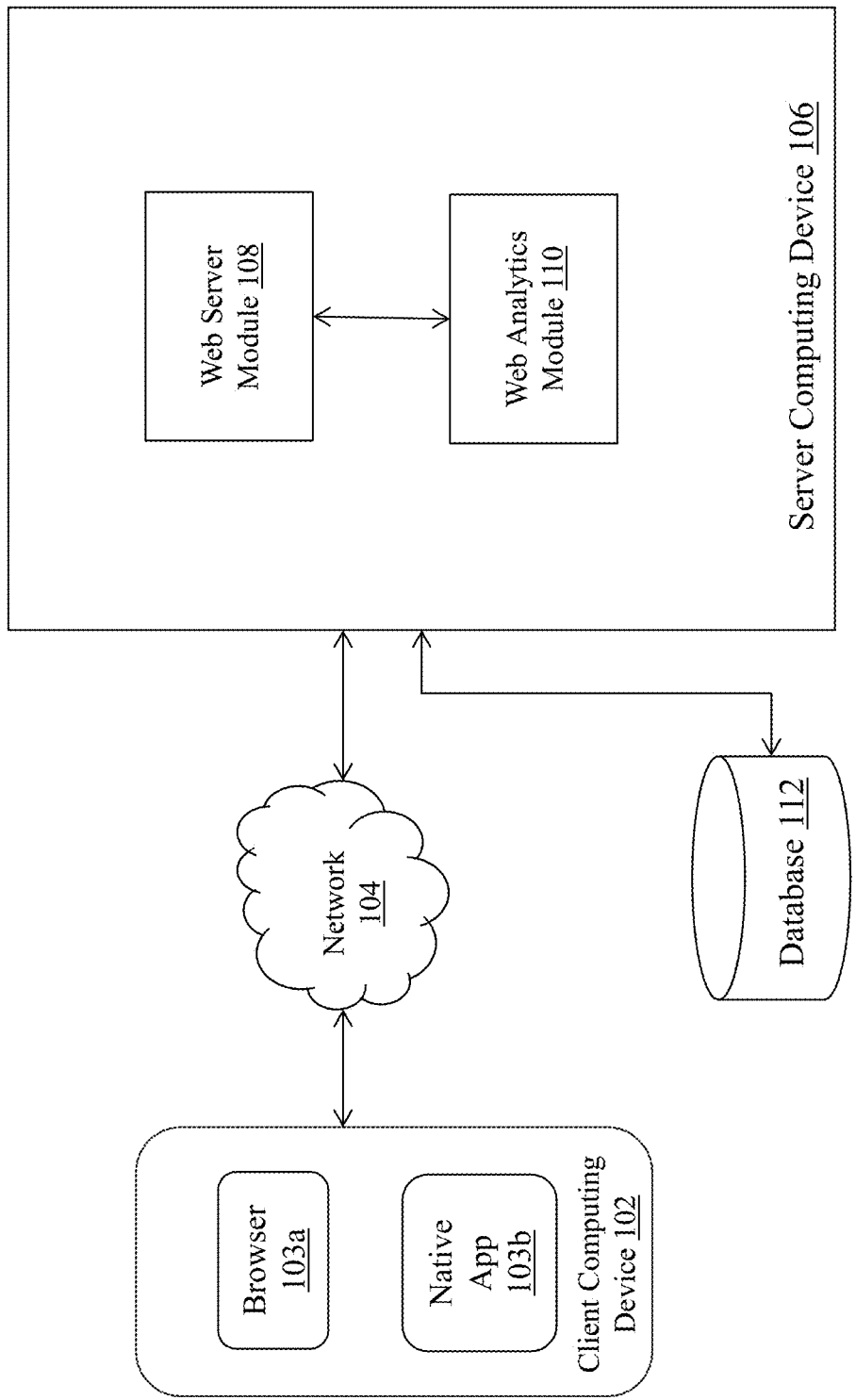
FIG. 1 is a block diagram of a system for dynamic generation of custom web analytics data.

FIG. 1 is a block diagram of a system 100 for dynamic generation of custom web analytics data. The system 100 includes a client computing device 102, a communications network 104, a server computing device 106 with a web server module 108 and a web analytics module 110, and a database 112.

The client computing device 102 connects to the communications network 104 in order to communicate with the server computing device 106 to provide input and receive output relating to the process of dynamic generation of custom web analytics data as described herein. Exemplary client computing devices 102 include but are not limited to computing devices such as smartphones, tablets, laptops, desktops, smart watches, internet appliances, or other devices capable of establishing a communication session with server computing device 106. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The browser application 103a comprises software executing on a processor of the client device 102 that enables the mobile device to communicate via HTTP or HTTPS with remote servers addressable with URLs (e.g., web server module 108 of server computing device 106) to receive website-related content, including one or more webpages, for rendering in the browser application and presentation on a display device coupled to or embedded in the client device 102. Exemplary mobile browser application software includes, but is not limited to, Firefox™, Chrome M, Safari™, and other similar software. The one or more webpages can comprise visual and audio content for display to and interaction with a user.

The native application 103b is a software application (also called an 'app') that is installed locally on the client computing device 102 and written with programmatic code designed to interact with an operating system that is native to the client device 102. Such software is available from, e.g., the Apple® App Store, the Google® Play Store or other web-based software repositories. In some embodiments, the native application 103ba includes a software development kit (SDK) module that is executed by a processor of the client device 102 to render content, detect user interactions, store data locally, and other computing functions as described herein.

The communications network 104 enables the client computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 is a device including specialized hardware and/or software modules that execute on a processor and interact with memory modules of the server computing device 106, to receive data from other components of the system 100, transmit data to other components of the system 100, and perform functions for dynamic generation of custom web analytics data as described herein. The server computing device 106 includes a plurality of computing modules 108, 110 that execute on one or more processors of the server computing device 106. In some embodiments, the modules 108, 110 are specialized sets of computer software instructions programmed onto one or more dedicated processors in the server computing device 106 and can include specifically-designated memory locations and/or registers for executing the specialized computer software instructions.

Although the modules 108, 110 are shown in FIG. 1 as executing within the same server computing device 106, in some embodiments the functionality of the modules 108, 110 can be distributed among a plurality of server computing devices. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention.

The web server module 108 generates and/or hosts a website, to which the client device 102 connects to retrieve and display webpage content. Typically, the website comprises a plurality of visual and non-visual elements that make up the content transmitted and displayed to a user when, e.g., browser software 103a on the client computing device 102 connects to the web server module 108 of server computing device 106 via a communications network 104 (e.g., Internet) and requests content from the website. The elements of a website include, but are not limited to, webpages (e.g., HTML documents), image files, layouts, color sets, stylesheets, document object models (DOM), tracking elements, instrumentations (e.g., analytics code), metadata, URLs, and content (e.g., text, audio, video).

During a communication session between the web server module 108 and the browser 103a or native app 103b of the client computing device 102, the web analytics module 110 captures certain information from the client device 102 relating to the usage of and interaction with the website. In one example, when a user of client computing device 102 launches browser 103a or native app 103b, and activates a website URL that is tagged with web analytics, the browser 103a or native app 130b transmits a request to the web server module 108 (e.g., an HTTP or HTTPS request), the web server module 108 generates and/or retrieves webpage content and code, and transmits the content and code to the client device 102, where the webpage is loaded and rendered by the browser 103a or native app 103b.

As the webpage loads, certain code in the page executes (i.e., a web analytics tag), which transmits a request to the web analytics module 110. Generally, a web analytics tag executes quickly and does not noticeably affect webpage load times. In some embodiments, the request comprises an image request and the module 110 returns a transparent pixel image in response to the request. Also, the tag can collect and send additional webpage status and interaction information included in the image request to the web analytics module 110, such as values for variables relating to the webpage, data associated with the client device 102, browser 103a, or native app 103b (e.g., operating system version, browser type, IP address), and the like. The web analytics module 110 receives the request comprising the webpage status and interaction information and stores the information in database 112. Further exemplary functionality of the computing modules 108 and 110 is described in detail below.

The database 112 is a computing device (or in some embodiments, a set of computing devices) coupled to the server computing device 106 and is configured to receive, generate, and store specific segments of data relating to the process of dynamic generation of custom web analytics data as described herein. In some embodiments, all or a portion of the database 112 can be integrated with the server computing device 106 or be located on a separate computing device or devices. The database 112 can comprise one or more databases configured to store portions of data used by the other components of the system 100, as will be described in greater detail below. An exemplary database 112 is MySQL™ available from Oracle Corp. of Redwood City, Calif.

Figure 2:
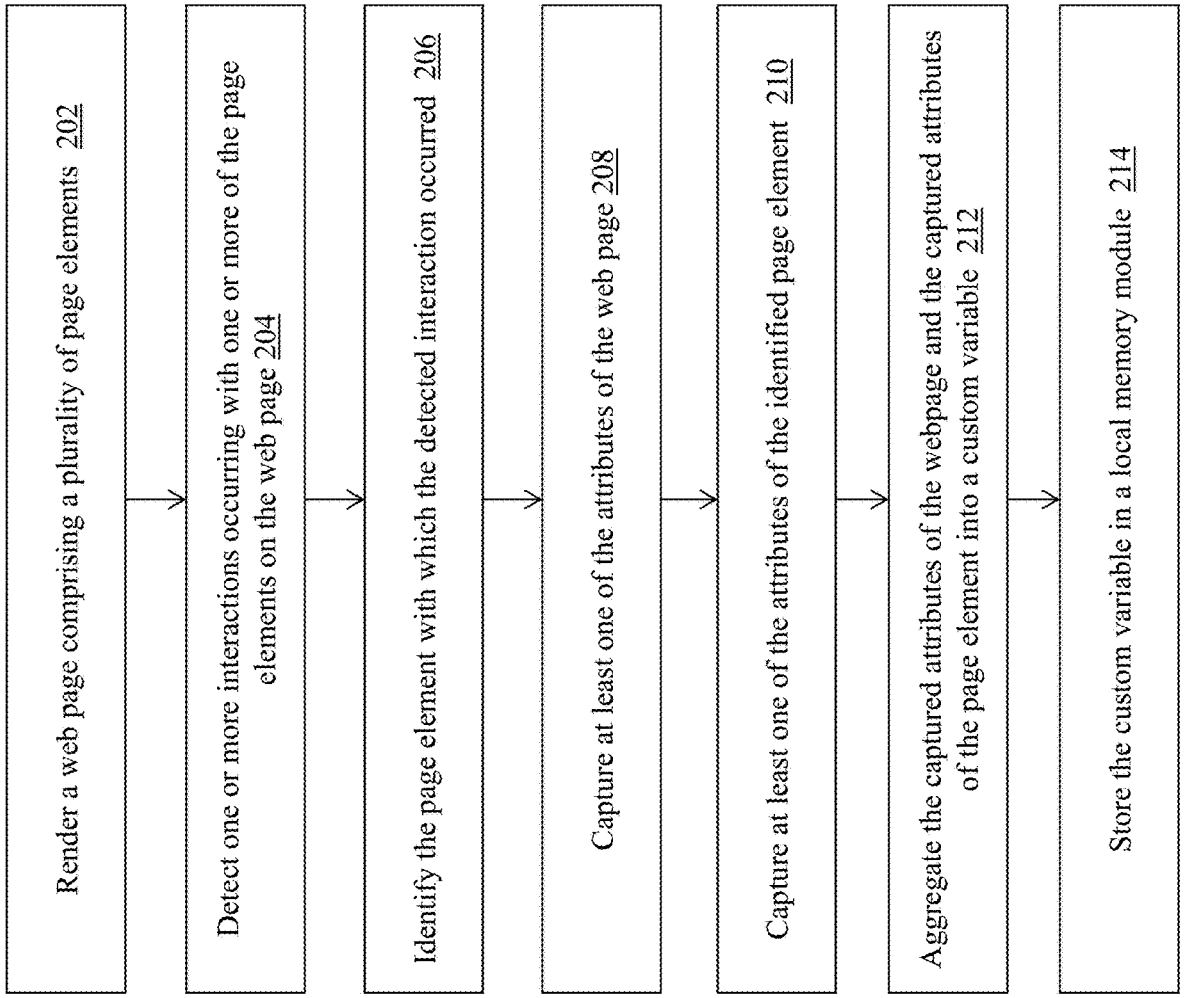
FIG. 2 is a flow diagram of a computerized method dynamic generation of custom web analytics data.

FIG. 2 is a flow diagram of a computerized method 200 of dynamic generation of custom web analytics data, using the system 100 of FIG. 1. A user at client computing device 102 launches browser 103a (or native app 103b), which connects to the web server module 108 via network 104. For example, the user may enter a URL into browser 103a which points to a web page hosted or served by the web server module 108, and browser 103a issues a web page request to web server module 108. In response to the request, the web server module 108 generates web page content and transmits the content back to the browser 103a. The browser 103a renders (202) a web page using the received content. The web page comprises a plurality of page elements, including non-interactive elements such as text, images, and styles, and interactive input elements such as check boxes, drop down menus, text fields, and buttons. It should be appreciated that other types of non-interactive and interactive elements can be considered within the scope of invention. Also, for the purposes of explanation, the browser 103a is referred to herein with respect to FIG. 2, but it should be appreciated that the native app 103b can provide the same or similar functionality.

As mentioned previously, during rendering of the web page, code in the web page can execute to cause the browser 103a to request a pixel image from web analytics module 110. As part of the response to this request, the web analytics module 110 can transmit code for execution by the browser 103a that instructs the browser 103a to continuously (or in some embodiments, periodically) listen for user interaction events or actions that occur with respect to the web page. For example, the code can be in the form of a Java™ package or applet that runs in the background of the browser 103a and is configured to detect interactions with one or more of the page elements.

Using this code, the browser 103a (or native app 103b) detects (204) one or more interactions occurring with one or more page elements on the web page. For example, when the user of client device 102 is presented with the rendered web page, the user may interact with one or more of the plurality of page elements-such as clicking a page element (single or double click), mousing over the page element (i.e., placing a mouse cursor on the element without clicking), performing a swipe or other type of touch gesture on the page element (in the case of touch-capable devices like certain smartphones or tablets), or viewing a page element (e.g., by expanding a closed section of the web page to reveal additional page elements). Interactions can also be initiated by the browser 103a and/or client device 102, such as a load or refresh of the web page, a change to a document object model (DOM) of the web page, and so forth.

As mentioned above, the browser 103a detects the one or more interactions occurring on the web page and performs the following processing steps for each detected interaction. The browser 103a identifies (206) the page element with which the detection interaction occurred. For example, when a user clicks on a check box, the browser 103a can detect the interaction and associate the interaction with the check box through use of an identifier (e.g., an id attribute of the check box as defined in the HTML code of the web page) or other attribute assigned to the check box.

The browser 103a captures (208) at least one of the one or more attributes of the web page. For example, the browser 103a can capture the value of (or at least a portion of the value of) one or more HTML attributes for the web page by scanning the HTML code. Similarly, the browser 103a captures (210) at least one of the one or more attributes of the identified web page element. In one example, the browser 103a can capture the value (or portion thereof) of any number of different HTML attributes for a given web page element—such as src, href, title, class, id, text, alt, value, width, height, and so on. A non-exhaustive list of HTML attributes that can be captured by the browser 103a is found at: https://www.w3schools.com/tags/ref_attributes.asp.

After capturing relevant attributes of the web page and of the identified page element, the browser 103a aggregates (212) the captured attributes of the web page and the captured attributes of the identified page element into a custom variable. In one embodiment, the browser 103a concatenates each captured attribute of the web page and each captured attribute of the identified page element into a string, where the captured attributes are separated from each other by a delimiter, and assigns the string to a custom variable. An exemplary aggregation of the captured attributes is provided below, with the symbol '|' comprising the delimiter:

/home/products|alpha|undefined|gateway|overflow|undefined

It should be appreciated that, in some embodiments, the browser 103a can capture attributes for other page elements in addition to attributes for the identified page elements. In one embodiment, the browser 103a can capture attributes for all of the page elements upon detecting the occurrence of an interaction on the web page.

Figure 3:
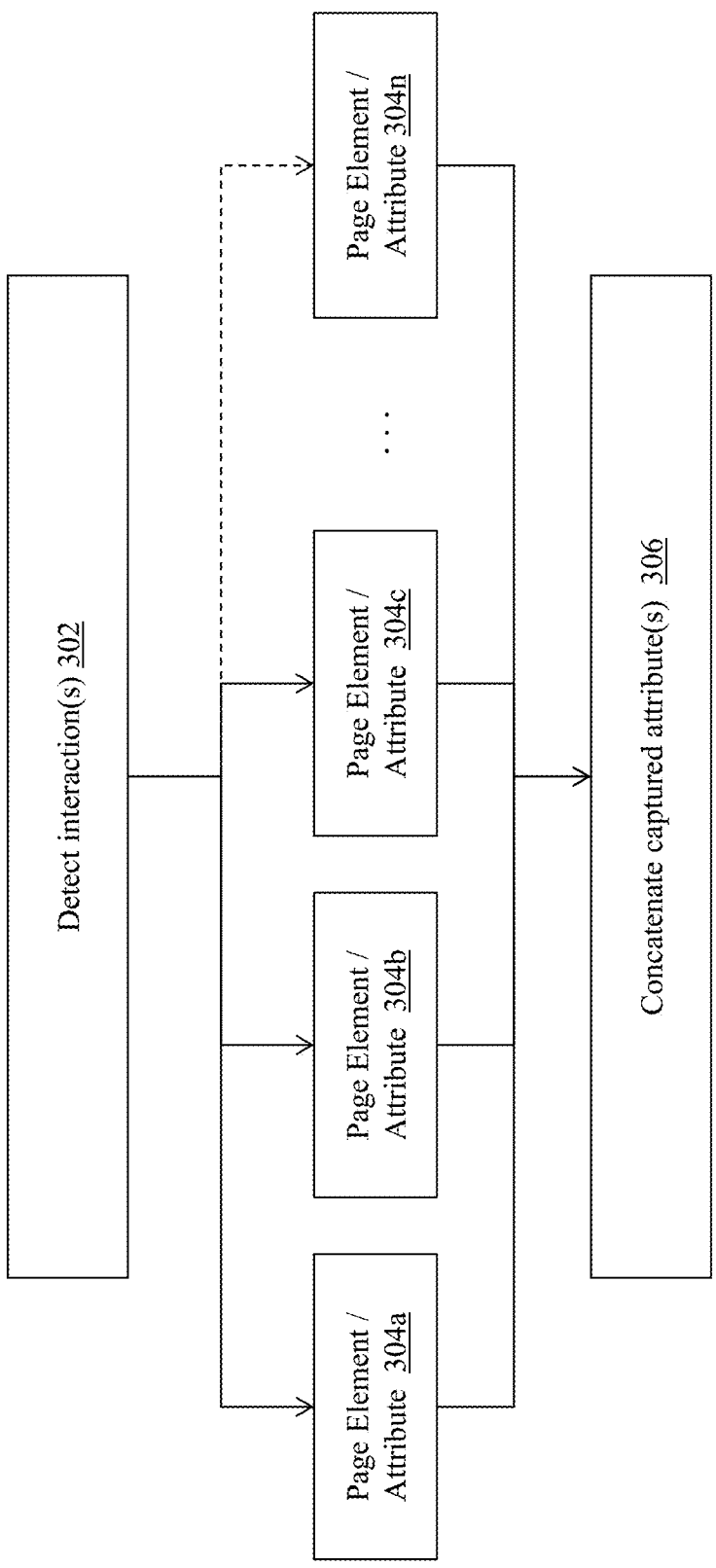
FIG. 3 is a diagram of an exemplary workflow performed by the browser to generate an aggregation of the captured attributes into a custom variable upon detecting an interaction.

FIG. 3 is a diagram of an exemplary workflow 300 performed by the browser 103a to generate an aggregation of the captured attributes into a custom variable upon detecting an interaction. As shown in FIG. 3, the browser 103a detects (302) interactions occurring with the web page and/or web page elements. Because each interaction can trigger a plurality of page elements, and attributes within those elements, the browser 103a identifies page elements and captures corresponding attributes from those elements (304a-304n), then aggregates (306) the captured element attributes into the custom variable.

Turning back to FIG. 2, the browser 103a stores (214) the custom variable in a local memory module of the client computing device 102. In one embodiment, the browser 103a generates a cookie based upon the custom variable and stores the cookie in browser memory associated with the web page—such that the custom variable is now connected to the web page domain and can be accessed by the web server module 108 and web analytics module 110. In some embodiments, the browser 103a can write the custom variable to a local storage medium in the client device 102. In some embodiments, the browser 103a can overwrite the custom variable previously stored in local memory with a new custom variable that is generated upon detecting a new interaction occurring with one or more of the plurality of page elements on the web page. As such, the custom variable is continuously updated by the browser 103a as subsequent interactions occur and at a certain point in time, the browser 103a can transmit the custom variable to, e.g., web analytics module 110.

Also, in some embodiments the browser 103a automatically transmits the custom variable to the web analytics module 110 when an initial custom variable (or an updated custom variable) is stored in the local memory—for example, the web page can comprise instructions that, when executed by the browser 103a, cause the client device 102 to transmit the currently-stored custom variable to a specific destination address associated with the web analytics module 110. In this way, the custom web analytics variable is automatically received and processed by the web analytics module 108—resulting in real-time data ingestion upon the occurrence of an interaction with the web page. Upon receiving the custom variable, the web analytics module 110 can parse the custom variable (e.g., by extracting the attributes) and store the relevant attributes in specific sections of the database 112 for subsequent use by the web analytics module 110.

FIG. 4 is an exemplary web page 400 rendered by the browser 103a of the client computing device 102 and which employs the custom variable generation techniques described herein. As shown in FIG. 4, the web page 400 comprises a plurality of page elements (e.g., checkboxes 402, tabs 404, button 406). Upon loading, the browser 103a listens for interactions with the page (e.g., a click on one of the checkboxes 402) and then identifies the page element and captures attributes of the page and/or the page element for aggregation into a custom variable and storage in local memory as described above.

The generation and storage of a single, custom web analytics variable for a given web page, that is dynamically generated and updated, as set forth in the methods and systems described herein represents a significant improvement over existing web analytics methodologies that require configuration of static variables for individual page elements. The inventive techniques provide for more efficient and streamlined storage of web analytics variables, and enable seamless scaling to accommodate changes in web pages and web page elements without requiring a lengthy and complex reconfiguration of analytics variables and storage each time such web page changes are enacted.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for dynamic generation of custom web analytics data, the system comprising a computing device comprising a memory for storing computer-executable instructions and a processor that executes the computer executable instructions to:
    render a webpage comprising a plurality of page elements, wherein the webpage is assigned one or more attributes and each page element is assigned one or more attributes;
    detect one or more interactions occurring with one or more of the plurality of page elements on the webpage;
    at the time of each detected interaction:
        identify the page element with which the detected interaction occurred;
        identify one or more other page elements triggered by the detected interaction;
        capture at least one of the one or more attributes of the webpage;
        capture at least one of the one or more attributes of the identified page element;
        capture at least one of the one or more attributes of the one or more other page elements;
        aggregate the captured attributes of the webpage, the captured attributes of the identified page element, and the captured attributes of the one or more other page elements into a custom variable, the custom variable comprising a concatenation of each captured attribute of the webpage, each captured attribute of the identified page element, and each captured attribute of the one or more other page elements into a string, wherein each of the captured attributes in the string are separated by a delimiter; and
        store the custom variable in a local memory module of the computing device.

2. The system of claim 1, wherein the computing device automatically transmits the custom variable to a web analytics platform of a server computing device upon storing the custom variable in the local memory module.

3. The system of claim 2, wherein the web analytics platform parses the custom variable for storage in a web analytics database.

4. The system of claim 1, wherein the computing device overwrites the custom variable in the local memory module with a new custom variable upon detecting a new interaction occurring with one or more of the plurality of interactive elements on the webpage.

5. The system of claim 1, wherein the one or more attributes of the webpage and the one or more attributes of the page elements comprise HTML attributes.

6. The system of claim 1, wherein the HTML attributes comprise an href attribute, a src attribute, a title attribute, a class attribute, an id attribute, a text attribute, a value attribute, a width attribute, a height attribute, and an alt attribute.

7. The system of claim 1, wherein the one or more interactions comprise a single click of a page element, a double click of a page element, a mouseover of a page element, a view of a page element, a swipe of a page element, a load of the webpage, and a change to a document object model (DOM) of the webpage.

8. The system of claim 1, wherein storing the custom variable in a local memory module of the computing device comprises generating a cookie based upon the custom variable and storing the cookie in a browser memory associated with the webpage.

9. The system of claim 1, wherein detecting one or more interactions occurring with one or more of the plurality of page elements on the webpage comprises monitoring each of the plurality of page elements for interaction activity.

10. A computerized method of dynamic generation of custom web analytics data, the method comprising:
   rendering, by a computing device, a webpage comprising a plurality of page elements, wherein the webpage is assigned one or more attributes and each page element is assigned one or more attributes;
   detecting, by the computing device, one or more interactions occurring with one or more of the plurality of page elements on the webpage;
   at the time of each detected interaction:
      identifying, by the computing device, the page element with which the detected interaction occurred;
      identifying, by the computing device, one or more other page elements triggered by the detected interaction;
      capturing, by the computing device, at least one of the one or more attributes of the webpage;
      capturing, by the computing device, at least one of the one or more attributes of the identified page element;
      capturing, by the computing device, at least one of the one or more attributes of the one or more other page elements;
      aggregating, by the computing device, the captured attributes of the webpage, the captured attributes of the identified page element and the captured attributes of the one or more other page elements into a custom variable, the custom variable comprising a concatenation of each captured attribute of the webpage, each captured attribute of the identified page element, and each captured attribute of the one or more other page elements into a string, wherein each of the captured attributes in the string are separated by a delimiter; and
      storing, by the computing device, the custom variable in a local memory module of the computing device.

11. The method of claim 10, wherein the computing device automatically transmits the custom variable to a web analytics platform of a server computing device upon storing the custom variable in the local memory module.

12. The method of claim 11, wherein the web analytics platform parses the custom variable for storage in a web analytics database.

13. The method of claim 10, wherein the computing device overwrites the custom variable in the local memory module with a new custom variable upon detecting a new interaction occurring with one or more of the plurality of interactive elements on the webpage.

14. The method of claim 10, wherein the one or more attributes of the webpage and the one or more attributes of the page elements comprise HTML attributes.

15. The method of claim 10, wherein the HTML attributes comprise an href attribute, a src attribute, a title attribute, a class attribute, an id attribute, a text attribute, a value attribute, a width attribute, a height attribute, and an alt attribute.

16. The method of claim 10, wherein the one or more interactions comprise a single click of a page element, a double click of a page element, a mouseover of a page element, a view of a page element, a swipe of a page element, a load of the webpage, and a change to a document object model (DOM) of the webpage.

17. The method of claim 10, wherein storing the custom variable in a local memory module of the computing device comprises generating a cookie based upon the custom variable and storing the cookie in a browser memory associated with the webpage.

18. The method of claim 10, wherein detecting one or more interactions occurring with one or more of the plurality of page elements on the webpage comprises monitoring each of the plurality of page elements for interaction activity.

* * * * *